US008078218B2

(12) United States Patent
Park

(10) Patent No.: US 8,078,218 B2
(45) Date of Patent: Dec. 13, 2011

(54) MIDLET EXECUTION THROUGH TERMINAL

(75) Inventor: Mi Kyoung Park, Deajeon (KR)

(73) Assignee: LG Electronics Inc., Seoul (KR)

(*) Notice: Subject to any disclaimer, the term of this patent is extended or adjusted under 35 U.S.C. 154(b) by 704 days.

(21) Appl. No.: 11/941,046

(22) Filed: Nov. 15, 2007

(65) Prior Publication Data

US 2008/0125165 A1   May 29, 2008

(30) Foreign Application Priority Data

Nov. 20, 2006   (KR) ........................ 10-2006-0114706

(51) Int. Cl.
*H04M 1/00* (2006.01)
(52) U.S. Cl. .................. 455/550.1; 455/566; 455/575.1; 455/575.3; 455/567
(58) Field of Classification Search .................. 455/566, 455/567, 575.1, 575.3, 575.4, 550.1, 466
See application file for complete search history.

(56) References Cited

U.S. PATENT DOCUMENTS

| | | | |
|---|---|---|---|
| 6,304,765 B1* | 10/2001 | Cosgrove et al. | 455/575.3 |
| 7,302,280 B2* | 11/2007 | Hinckley et al. | 455/567 |
| 7,310,540 B2* | 12/2007 | Meins et al. | 455/575.1 |
| 7,548,756 B2* | 6/2009 | Velthuis et al. | 455/466 |
| 2003/0211872 A1* | 11/2003 | Meins et al. | 455/575.1 |
| 2005/0021801 A1* | 1/2005 | Kim | 709/230 |
| 2006/0200738 A1* | 9/2006 | Tarle et al. | 715/500 |
| 2006/0217110 A1* | 9/2006 | Othmer | 455/414.1 |
| 2006/0271696 A1* | 11/2006 | Chen et al. | 709/229 |
| 2007/0032262 A1* | 2/2007 | Namatame et al. | 455/550.1 |
| 2009/0054041 A1* | 2/2009 | Satake et al. | 455/412.2 |
| 2009/0137278 A1* | 5/2009 | Haru et al. | 455/566 |
| 2009/0197652 A1* | 8/2009 | Lundstrom et al. | 455/574 |
| 2009/0264100 A1* | 10/2009 | Sapir et al. | 455/411 |

FOREIGN PATENT DOCUMENTS

KR   1020060063011   6/2006

* cited by examiner

*Primary Examiner* — Fayyaz Alam
(74) *Attorney, Agent, or Firm* — Lee, Hong, Degerman, Kang & Waimey

(57) ABSTRACT

A method for identifying receipt of a message at a mobile terminal comprising a first body and a second body positionable between open and closed states includes receiving a message via a wireless communication, determining an open state of the mobile terminal, and selectively providing a notification indicating the receiving of the message based upon the open state of the mobile terminal.

7 Claims, 9 Drawing Sheets

| PID | Type | Port | AppID | Status |
|---|---|---|---|---|
| 1 | SMS | 3716 | 1100302 | PUSH_STATUS_NOTI |

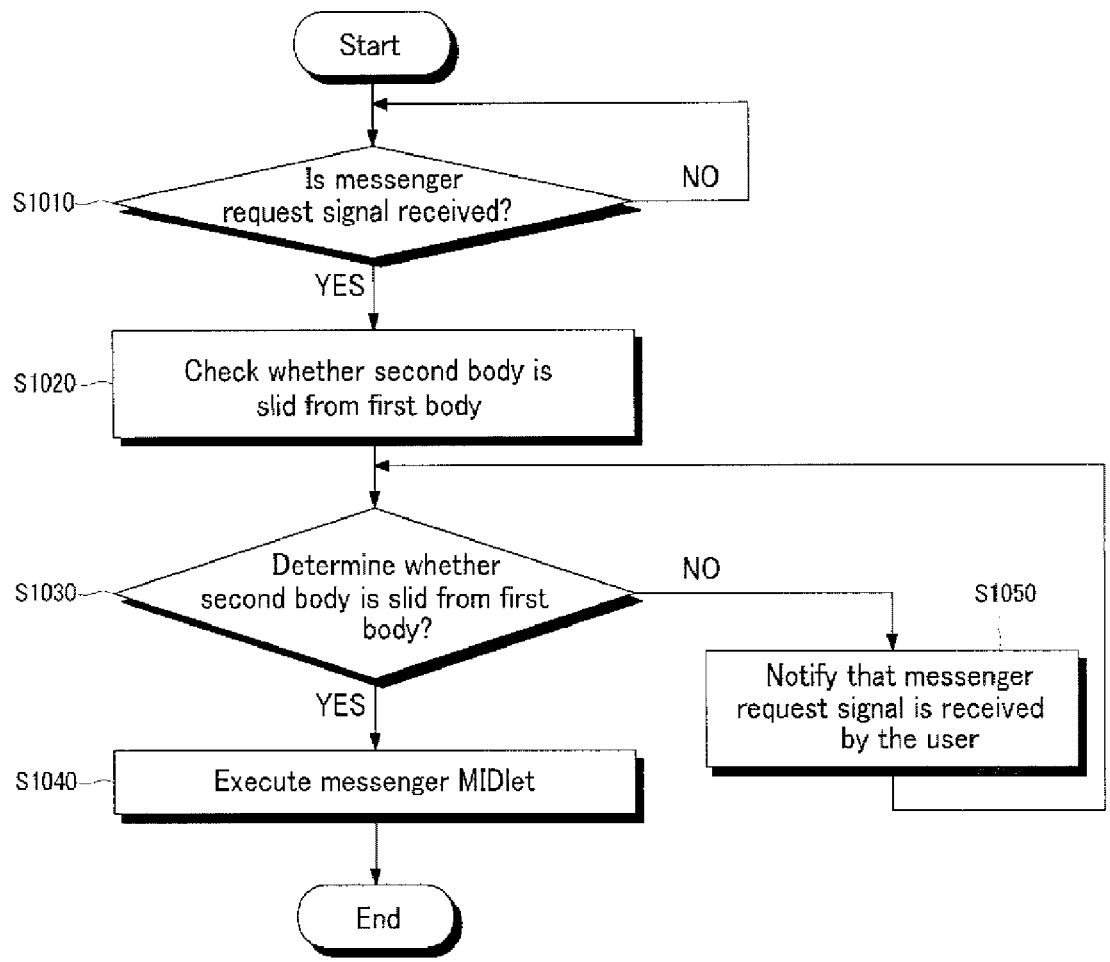

_US 8,078,218 B2_

MIDLET EXECUTION THROUGH TERMINAL

CROSS REFERENCE TO RELATED APPLICATION

Pursuant to 35 U.S.C. §119(a), this application claims the benefit of earlier filing date and right of priority to Korean Application No. 10-2006-0114706 filed on Nov. 20, 2006, the contents of which are hereby incorporated by reference herein in their entirety.

BACKGROUND OF THE INVENTION

1. Field of the Invention

The present invention relates to a MIDlet (Mobile Information Device Application) execution through terminal.

2. Discussion of the Related Art

Nowadays, a mobile terminal user chats with others using a messenger MIDlet installed in the mobile terminal. The user sends a messenger request signal to another party's mobile terminal through a push registry and a user of a receiving mobile terminal checks the signal and executes the messenger MIDlet, thereby performing a wireless chat.

However, if the receiving mobile terminal is a folder type, the folder type mobile terminal does not have a notification function, such as making a reception sound or brightening a sub-LCD, when the messenger request signal is received while the terminal is in a closed state.

Further, when the messenger request signal was received while the mobile terminal is in a closed state, the corresponding messenger MIDlet was unconditionally executed by the receiving mobile terminal.

Accordingly, even if the messenger MIDlet was automatically executed upon reception of the messenger request signal by a terminal, the user could not see the execution of the messenger MIDlet and the power of a battery was consumed due to the automatic execution of the corresponding MIDlet.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect, a method for identifying receipt of a message at a mobile terminal having a first body and a second body positionable between open and closed states receives a message via a wireless communication, determines an open state of the mobile terminal, and selectively provides a notification indicating the receiving of the message based upon the open state of the mobile terminal.

In another aspect, a mobile terminal having a first body and a second body positionable between open and closed states includes a communication module for receiving a message, a sensor for sensing an open state of the mobile terminal, and a controller for selectively providing a notification indicating the receiving of the message based upon the open state of the mobile terminal.

In still another aspect, a method for identifying receipt of a message and executing a messenger mobile information device application (MIDlet) at a mobile terminal having a first body and a second body positionable between open and closed states receives a message via a wireless communication and determines whether the message is equal to a previously received message.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

Embodiments of the present invention are herein described in detail with reference to the following drawings in which like numerals refer to like elements.

The above and other aspects, features, and advantages of the present invention will become more apparent upon consideration of the following description of preferred embodiments, taken in conjunction with the accompanying drawing figures.

FIG. 10 is a flowchart illustrating a MIDlet execution method in a slide type mobile terminal in still another embodiment of the present invention.

DETAILED DESCRIPTION OF THE PREFERRED EMBODIMENT

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1A:
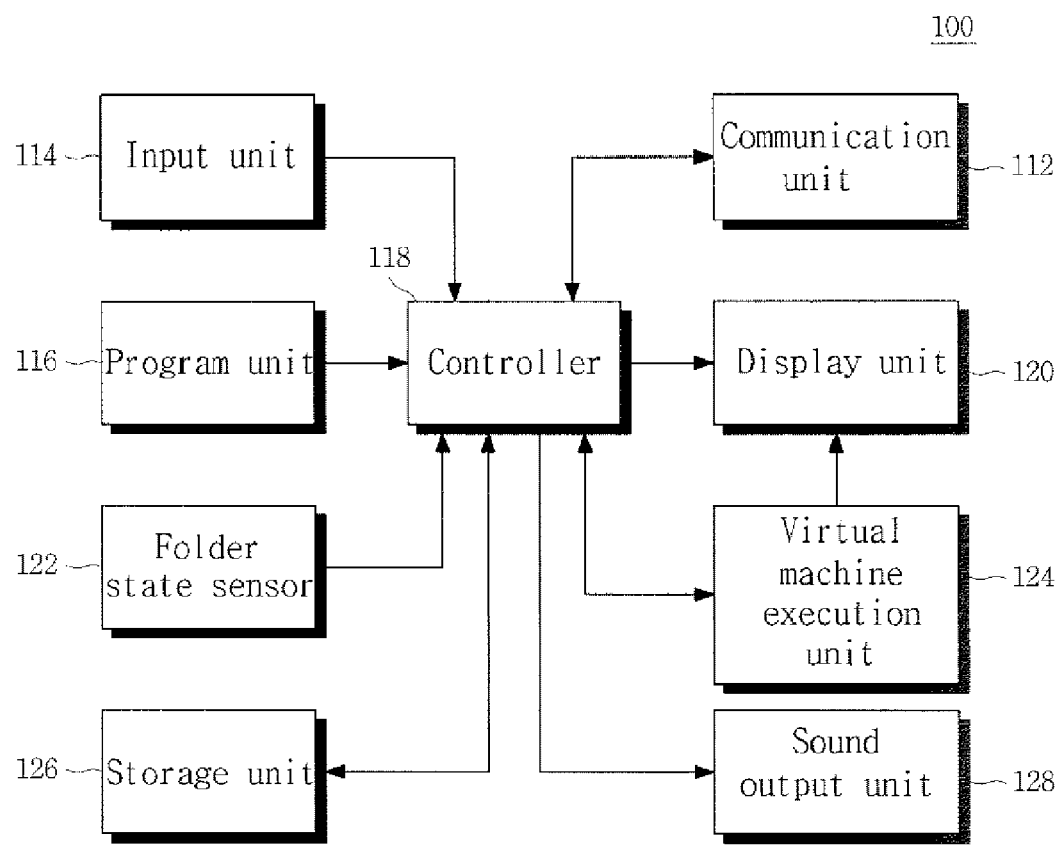
FIG. 1A is a block diagram illustrating a configuration of a folder type mobile terminal to which a MIDlet execution method is applied in one embodiment of the present invention.
Figure 1B:
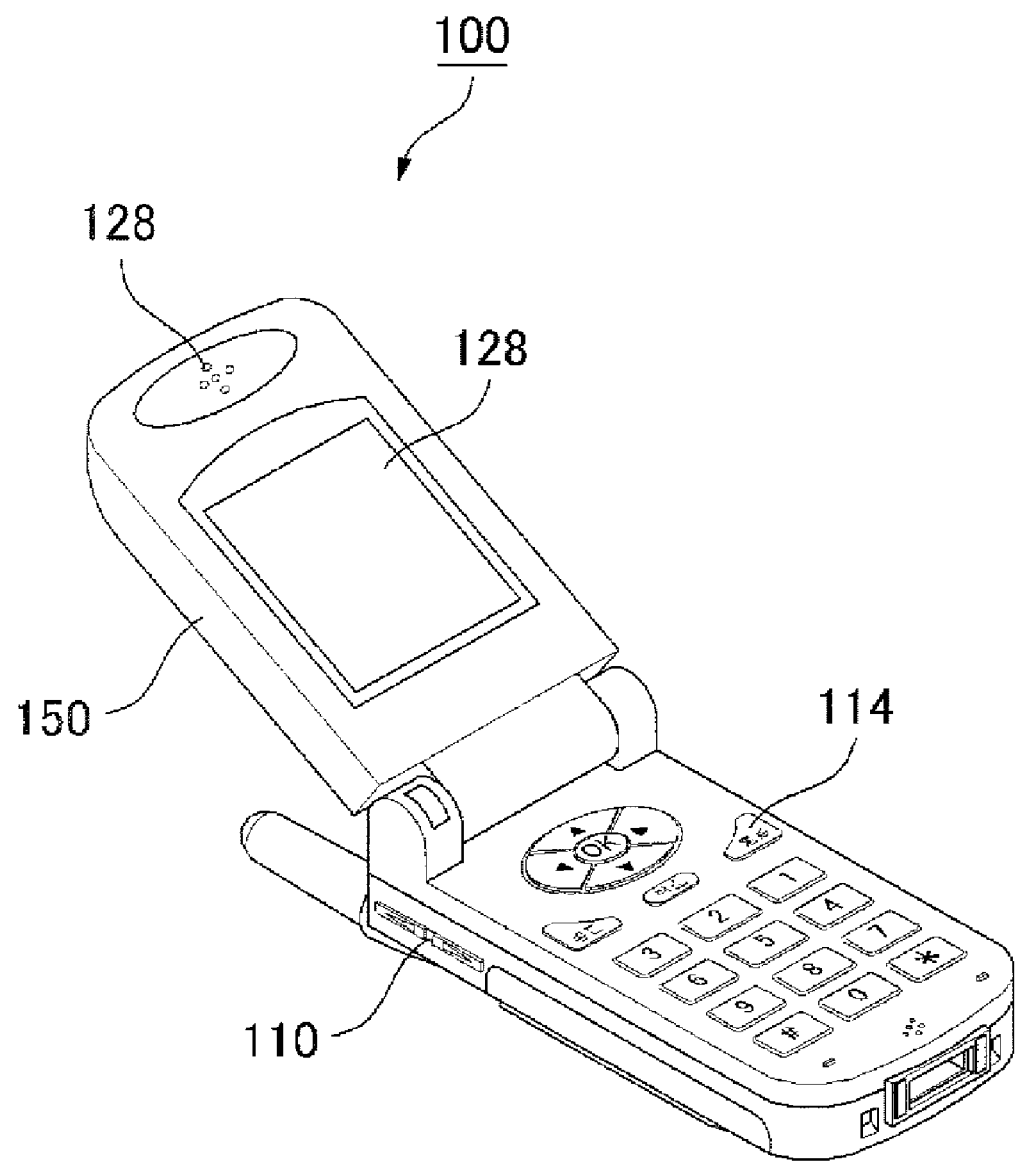
FIG. 1B illustrates an external shape of a folder type mobile terminal.

FIG. 1A is a block diagram illustrating a configuration of a folder type mobile terminal which may be used to execute a Midlet, in accordance with one embodiment of the present application, and FIG. 1B illustrates an external shape of the folder type mobile terminal.

Referring to FIGS. 1A and 1B, the folder type mobile terminal 100 according to one aspect of the present invention comprises a first body 110. The folder type mobile terminal can be opened by moving first body 110 relative to second body 150.

As shown in FIG. 1A, the folder type mobile terminal 100 comprises a communication module 112, an input unit 114, a program unit 116, a controller 118, a display 120, a folder state sensor 122, a virtual machine execution unit 124, a storage unit 126, and a sound output unit 128.

The communication module 112 receives a Java MIDlet from a Wireless Application Protocol (WAP) service or a Web page through wireless communication. Further, the communication module 112 receives a messenger request signal. The communication module 112 transmits to and receives a sound signal or data from another mobile terminal through a mobile communication network.

A user's instruction is inputted to the input unit 114 and the input unit 114 transfers the instruction to the controller 118. Particularly, the input unit 114 transfers the user's instruction for execution of a messenger MIDlet to the controller 118.

The program unit 116 stores a MIDlet execution program for executing the messenger MIDlet or notifying reception of the messenger request signal to the user according to the state of a folder, whether opened or closed, when the messenger request signal is received. Further, the program unit 116 comprises an operating system of the folder type mobile terminal 100. The program unit 116 may also comprise a push list management table for displaying a management state of a push registry.

If the messenger request signal is received through the communication module 112, the controller 118 checks the state of a folder, whether opened or closed, through the folder state sensor 122. If the folder is in an opened state, the controller 118 immediately executes the messenger MIDlet, and if the folder is in a closed state, the controller 118 notifies reception of the messenger request signal to the user with a sound or display. That is, the controller 118 notifies reception of the messenger request signal to the user by outputting a sound, brightening a sub-LCD of the display 120, or displaying a message.

The display 120 displays an operation state of the mobile terminal. Further, the display 120 notifies reception of the messenger request signal to the user. For this reason, the display 120 has an LCD or OLED frame for displaying a notification state. Here, the LCD frame or OLED frame has a predetermined size in a width and length for displaying the notification state.

The folder state sensor 122 senses whether the folder is in an opened or closed state. Here, the folder state sensor 122 senses the opened or closed state of the folder based on an MIDP 2.0 (JSR 118) specification.

The virtual machine execution unit 124 is operated with execution of a Windows API according to an operation of an operating system (OS) when the mobile terminal is turned on and executes a Java virtual machine. The Java virtual machine executes the messenger MIDlet according to the user's selection or automatically, and thus, displays image objects. Accordingly, the messenger MIDlet has a predetermined screen size to display the image objects.

The virtual machine execution unit 124 comprises a plurality of classes including a MIDlet class required for executing the Java virtual machine.

The storage unit 126 stores the messenger MIDlet received through the communication module 112. Further, the storage unit 126 stores image objects for displaying the messenger MIDlet on a screen and temporarily stores image objects scaled to fit the screen size of the display 120.

The sound output 128 outputs an audible reception sound for notifying that the messenger request signal was received.

Further, as shown in FIG. 1B, the folder type mobile terminal 100 may include the input unit 114 on an upper surface of the first body 110, and also include the display 120 and the sound output unit 128 on an upper surface of the second body 150.

Figure 2:
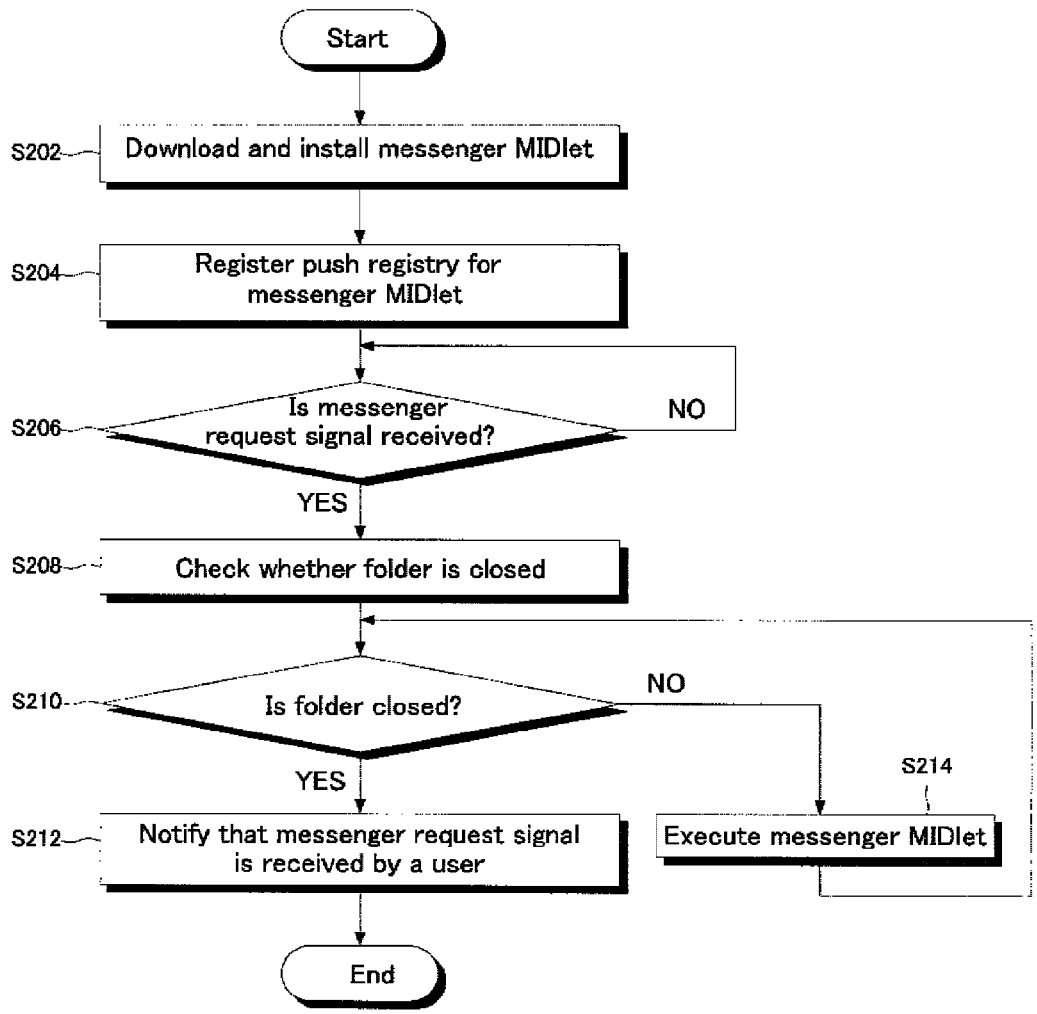
FIG. 2 is a flowchart illustrating a MIDlet execution method of a folder type mobile terminal in one embodiment of the present invention.

FIG. 2 is a flowchart illustrating a method for executing a MIDlet on a folder type mobile terminal according to one embodiment of the present invention.

First, a user downloads and installs a messenger MIDlet to the folder type mobile terminal 100 using a push registry from a web page or a WAP service (S202).

Figure 3:
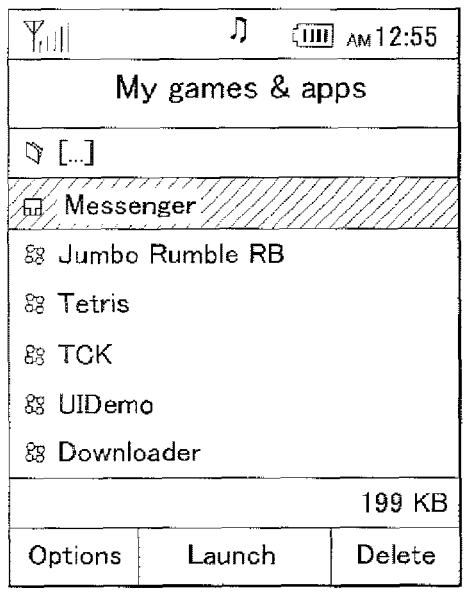
FIG. 3 illustrates a list of Java programs to which a messenger MIDlet is added.

That is, the controller 118 of the folder type mobile terminal 100 stores the downloaded messenger MIDlet at the storage unit 126, installs the corresponding messenger MIDlet, and adds the messenger MIDlet to a Java program of the program unit 116. As shown in FIG. 3, a messenger MIDlet (Messenger) is added to a list of Java programs.

FIG. 3 illustrates a list of a Java programs to which the messenger MIDlet is added. As an example of the MIDlet using a push registry, an instant messenger (IM) MIDlet is shown.

Figure 4:
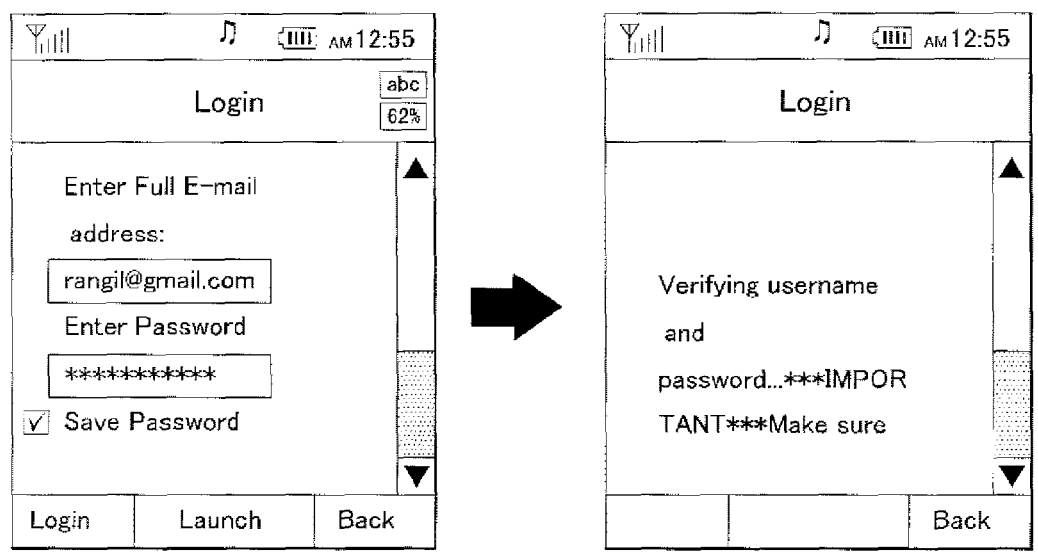
FIG. 4 illustrates a process of registering a push registry by inputting an ID and a password.

Next, as shown in FIG. 4, the mobile terminal 100 registers a push registry for the messenger MIDlet in order to use the installed messenger MIDlet (S204).

As shown in FIG. 4, the user inputs an identification (ID) and password through the input unit 114 and the controller 118 registers the push registry.

FIG. 4 illustrates a process of registering a push registry by inputting an ID and a password.

The controller 118 registers the push registry through a process of checking the identification (ID) and password inputted by the user.

When other party's mobile terminal requests to have a chat with a messenger of the mobile terminal 100, the mobile terminal 100 receives a messenger request signal from the other party's mobile terminal through the communication module 112 via a mobile communication network (S206 in FIG. 2).

The controller 118 checks whether the folder is closed using the folder state sensor 122 (S208 in FIG. 2). That is, the controller 118 senses whether first body 110 is open relative to second body 150 using state sensor 122.

Figure 6:
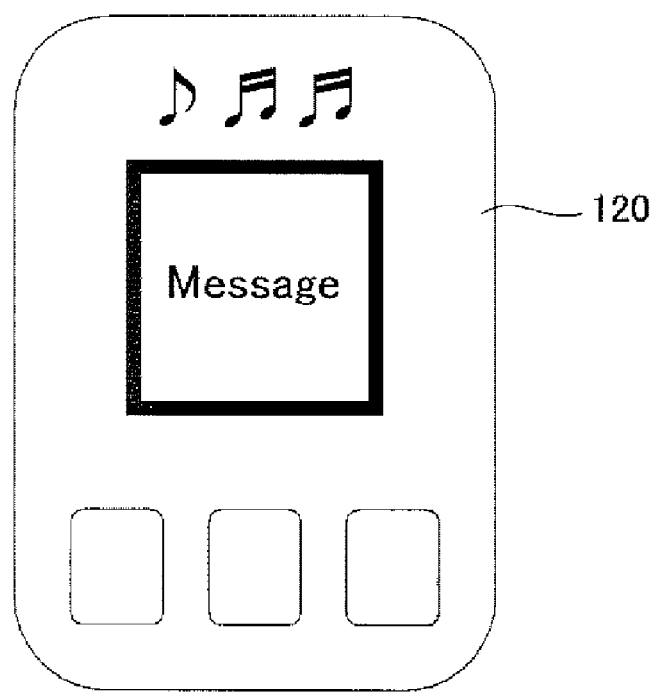
FIG. 6 illustrates a screen for notifying that a messenger request signal was received by a user by displaying a message.

If the terminal is closed (S210—YES in FIG. 2), the controller 118 displays a message notifying that the messenger request signal was received using the display 120, as shown in FIG. 6, or outputs a reception sound through the sound output unit 128 (S212 in FIG. 2). Here, FIG. 6 illustrates a screen for notifying that the messenger request signal was received to the user by displaying a message.

Further, the controller 118 can notify that the messenger request signal was received to the user by brightening a sub-LCD through the display 120.

Figure 5:
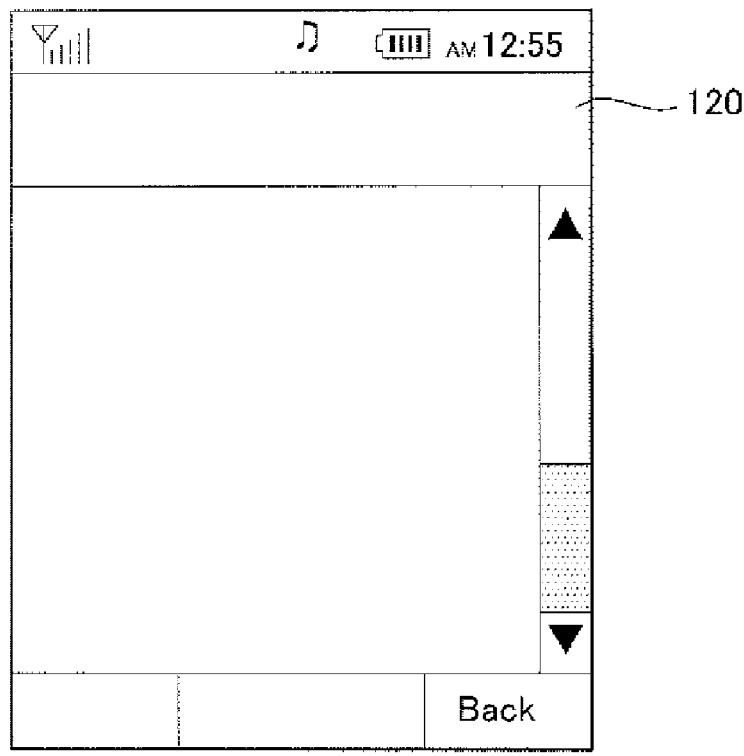
FIG. 5 illustrates a screen for immediately executing a messenger MIDlet when a messenger request signal is received while a folder-type terminal is in an opened state.

However, if it is sensed as the terminal is open (S210—NO in FIG. 2), the controller 118 executes the messenger MIDlet as shown in FIG. 5 (S214 in FIG. 2). Here, FIG. 5 illustrates a screen for executing the messenger MIDlet when the messenger request signal was received while the terminal was open.

Figure 7:
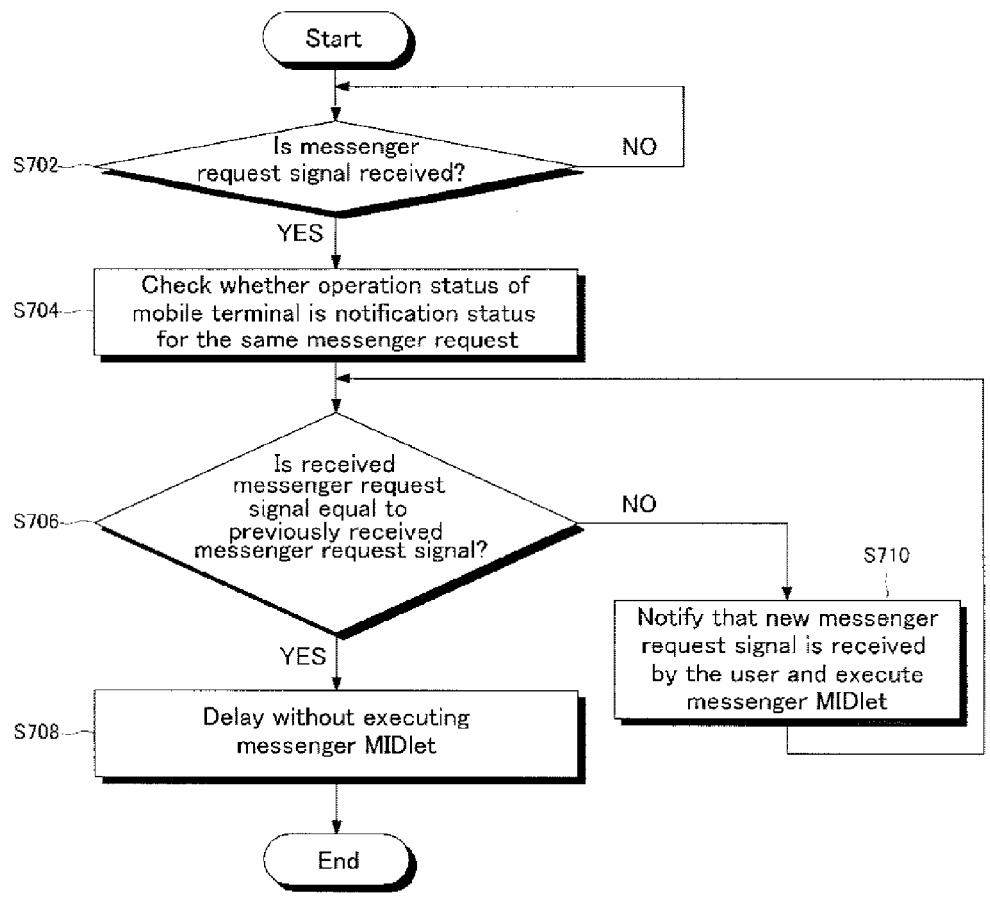
FIG. 7 is a flowchart illustrating a MIDlet execution method of a mobile terminal in another embodiment of the present invention.

FIG. 7 is a flowchart illustrating a MIDlet execution method in a mobile terminal in another embodiment of the present invention.

Another embodiment of the present invention illustrates a MIDlet execution process when an identical or different messenger request signal is received again after a messenger request signal was once received by the user's mobile terminal.

This embodiment can be applied to a slide type mobile terminal as well as a folder type mobile terminal. However, for convenience of description, only the folder type mobile terminal is described herein.

In a process shown in FIG. 7, the mobile terminal 100 receives a messenger request signal through the communication module 112 (S702).

Controller 118 checks whether an operation status of the mobile terminal is a notification status for the same messenger request (S704).

Figures 8, 9A:
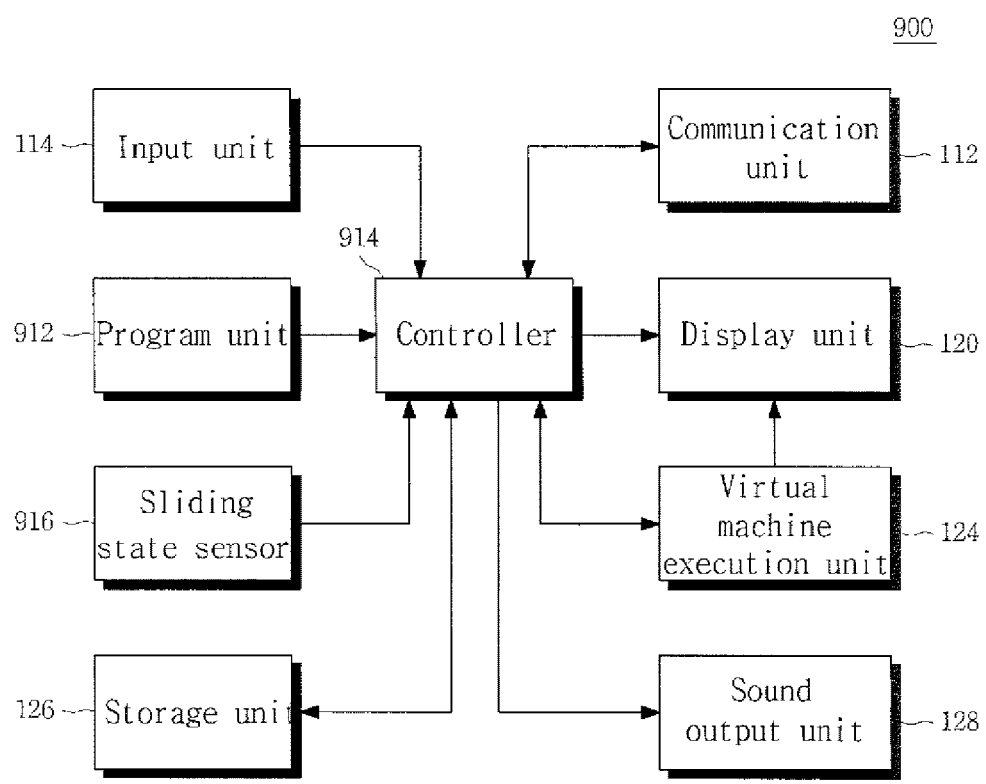
FIG. 8 illustrates a push list management table.
FIG. 9A is a block diagram illustrating a configuration of a slide type mobile terminal to which a MIDlet execution method is applied in still another embodiment of the present invention.

The controller 118 checks whether the mobile terminal is in a state of notifying the user that a messenger request signal was received through the display 120, or in a state of notifying the user through the sound output 128, using a push list management table of the program unit 116, as shown in FIG. 8.

As shown in FIG. 8, the push list management table comprises an ID (PID) of a push registry, transmission type of a push registry, a transmission port, an application ID (AppID), and a state of a push registry.

If the currently received messenger request signal is equal to a previously received messenger request signal (S706—YES in FIG. 7), the controller 118 delays execution of the messenger MIDlet until an execution instruction by the user for the messenger MIDlet is received from the input unit 114 (S708 in FIG. 7).

However, if the received messenger request signal is not equal to the previously received messenger request signal (S706—NO in FIG. 7), and the terminal is closed, the controller 118 notifies that a new messenger request signal was received to the user. Otherwise, if the terminal is opened, the controller executes the messenger MIDlet (S710 in FIG. 7).

Accordingly, if the messenger request signal is received while the folder is in a closed state, the messenger MIDlet will not be immediately executed, preventing unnecessary power consumption.

According to one aspect of the present invention, a folder type mobile terminal is described in the present application. However, the disclosure according to one aspect of the present invention can also be equally applied to a slide type mobile terminal.

Figure 9B:
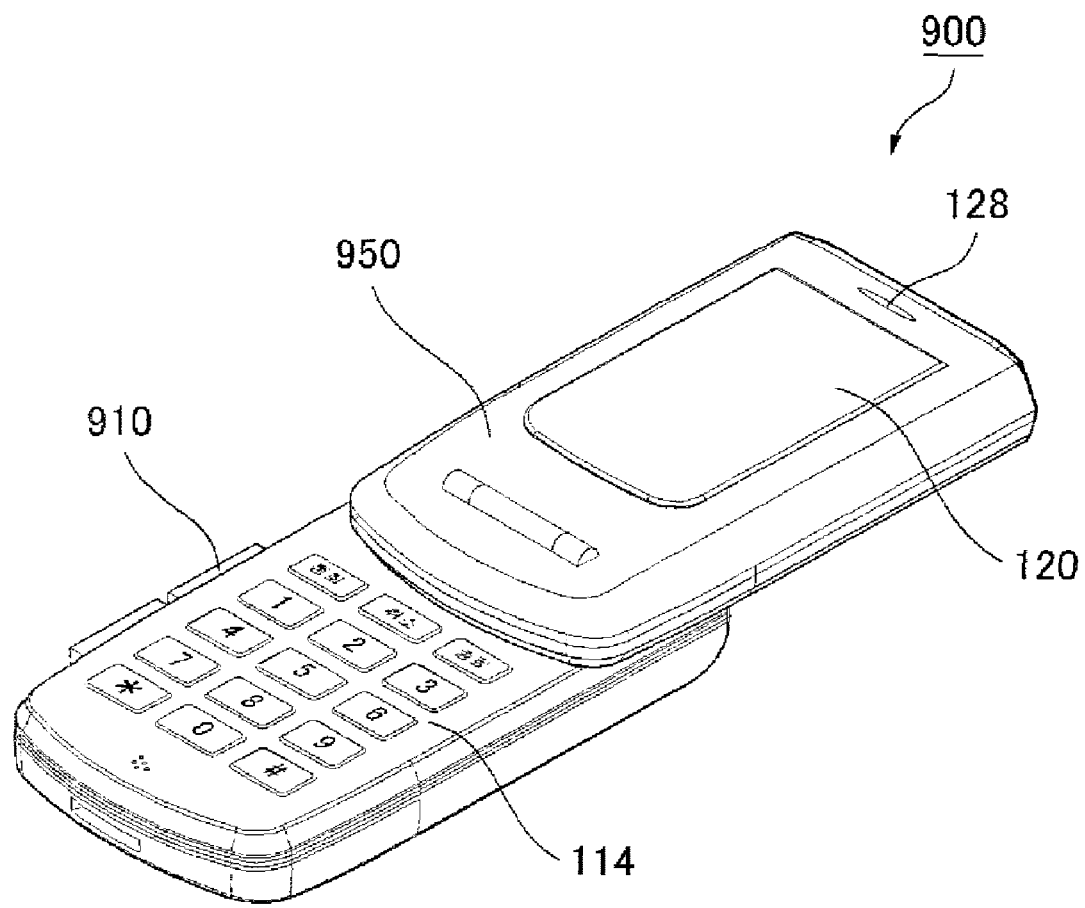
FIG. 9B illustrates an external shape of a slide type mobile terminal.

FIG. 9A is a block diagram illustrating a configuration of a slide type mobile terminal configured to execute a MIDlet according to still another embodiment of the present invention, and FIG. 9B illustrates an external shape of the slide type mobile terminal.

Referring to FIGS. 9A and 9B, a slide type mobile terminal 900 according to one aspect of the present invention comprises a communication module 112, an input unit 114, a program unit 912, a controller 914, a display 120, a sliding state sensor 916, a virtual machine execution unit 124, a storage unit 126, and a sound output unit 128.

The communication module 112, the input unit 114, the display 120, the virtual machine execution unit 124, the storage unit 126, and the sound output unit 128 have the same configuration and function as those shown in FIG. 1, and thus, the description thereof will be omitted.

Further, the slide type mobile terminal 900 may comprise a first body 910, and a second body 950 that is slidable relative to the first body 910. Further, as shown in FIG. 9B, the slide type mobile terminal 900 may include the input unit 114 on an upper surface of the first body 910, and also include the display 120 and the sound output 128 on an upper surface of the second body 950.

In FIG. 9A, the program unit 912 stores a MIDlet program for executing a messenger MIDlet or notifying reception of a messenger request signal to a user depending on the sliding state of the second body 950 when the messenger request signal is received. The program unit 130 comprises a push list management table for displaying a management state of a push registry.

When the messenger request signal is received through the communication module 112, the controller 914 checks the sliding state of the second body 950 through the sliding state sensor 916. If the second body 950 is slid from the first body 910, the controller 914 executes a messenger MIDlet, and if the second body 950 is not slid from the first body 910, notifies that the messenger request signal was received using sound or display. That is, the controller 914 notifies that the messenger request signal was received by outputting a sound, brightening a LCD through the display 120, or displaying a message.

The sliding state sensor 916 senses whether the second body 950 is slid from the first body 910. Here, the sliding state sensor 916 senses the sliding state based on a MIDP 2.0 (JSR 118) specification.

FIG. 10 is a flowchart illustrating a MIDlet execution method in a slide type mobile terminal in still another embodiment of the present invention.

First, the slide type mobile terminal 900 downloads and installs a messenger MIDlet using technologies similar to those performed for folder type terminals.

When another party's mobile terminal requests to have a chat with a messenger installed in the mobile terminal 900, the mobile terminal 900 receives a messenger request signal from the other party's mobile terminal through the communication module 112 via a mobile communication network (S1010).

When the messenger request signal is received, the controller 914 checks whether the second body 950 is slid from the first body 910 through the sliding state sensor 916 (S1020).

If it is determined that the second body 950 is slid from the first body 910 based on the sliding sensing signal (S1030—YES in FIG. 10), the controller 914 executes a messenger MIDlet, as shown in FIG. 5 (S1040 in FIG. 10).

That is, since the second body 950 is slid from the first body 910, the controller 914 executes the messenger MIDlet so that the user may instantly use the messenger.

However, if the second body 950 was not slid from the first body 910 (S1030—NO in FIG. 10), the controller 914 may display a message through the display 120 to notify that the messenger request signal was received without immediately executing the messenger MIDlet as shown in FIG. 6, or output a reception sound through the sound output unit 128 (S1050 in FIG. 10). Further, the controller 914 may brighten a sub-LCD through the display 120 to notify the user that the messenger request signal was received.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for executing a mobile information device application (MIDlet) in a mobile terminal comprising a sensor for sensing a state of the mobile terminal, the method comprising:

downloading a messenger MIDlet using a push registry;

installing the downloaded messenger MIDlet;

registering the push registry for the messenger MIDlet;

receiving a messenger request signal;

determining, by the sensor, the state of the mobile terminal in response to the received the messenger request signal, the state comprising an open state or a closed state;

executing the messenger MIDlet associated with the messenger request signal in response to determining that the mobile terminal is in the open state; and providing a notification indicating the receiving of the messenger request signal in response to determining that the mobile terminal is in the closed state.

2. The method of claim 1, wherein the method further comprises adding the messenger MIDlet to a list of Java™ programs after installing the downloaded messenger MIDlet.

3. The method of claim 1, wherein the messenger MIDlet is registered using an identification (ID) and password input by a user.

4. The method of claim 1, further comprising executing the messenger MIDlet associated with the messenger request signal when the mobile terminal is transitioned from the closed state to the open state in response to the notification.

5. The method of claim 1, further comprising providing the notification in response to determining that the messenger MIDlet is not being executed.

6. The method of claim 1, wherein the mobile terminal comprises at least a folder type mobile terminal or a slide type mobile terminal.

7. The method of claim 1, wherein the notification is provided at least visually or audibly when the mobile terminal is in the closed state.

* * * * *